United States Patent
Hatano

(10) Patent No.: US 8,103,864 B2
(45) Date of Patent: Jan. 24, 2012

(54) INFORMATION PROCESSING APPARATUS AND START-UP CONTROL METHOD

(75) Inventor: Ken Hatano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 893 days.

(21) Appl. No.: 12/124,072

(22) Filed: May 20, 2008

(65) Prior Publication Data

US 2008/0301428 A1 Dec. 4, 2008

(30) Foreign Application Priority Data

May 29, 2007 (JP) ................. 2007-142203

(51) Int. Cl.
*G06F 9/00* (2006.01)
*G06F 15/177* (2006.01)

(52) U.S. Cl. .............................. 713/2; 713/1

(58) Field of Classification Search .............. 713/1, 2; 726/2
See application file for complete search history.

(56) References Cited

U.S. PATENT DOCUMENTS

| | | | | |
|---|---|---|---|---|
| 5,402,492 A | * | 3/1995 | Goodman et al. | 726/20 |
| 6,161,135 A | * | 12/2000 | Ehrlich et al. | 709/221 |
| 7,000,249 B2 | * | 2/2006 | Lee | 726/20 |
| 7,500,093 B2 | * | 3/2009 | Makita | 713/2 |
| 7,607,000 B1 | * | 10/2009 | Smith et al. | 713/1 |
| 2004/0003222 A1 | * | 1/2004 | Rich et al. | 713/1 |
| 2005/0071624 A1 | * | 3/2005 | Rothman et al. | 713/100 |
| 2005/0198485 A1 | * | 9/2005 | Nguyen et al. | 713/1 |
| 2006/0010317 A1 | * | 1/2006 | Lee | 713/2 |
| 2006/0020810 A1 | * | 1/2006 | Waltermann et al. | 713/179 |
| 2006/0064577 A1 | * | 3/2006 | Chiu et al. | 713/2 |
| 2006/0195686 A1 | * | 8/2006 | Makita | 713/2 |
| 2006/0294359 A1 | * | 12/2006 | Chou et al. | 713/2 |
| 2007/0067539 A1 | * | 3/2007 | Morrow | 710/305 |
| 2008/0147962 A1 | * | 6/2008 | Diggs et al. | 711/103 |
| 2008/0301774 A1 | * | 12/2008 | Hori | 726/3 |

FOREIGN PATENT DOCUMENTS

JP   2000-222185   8/2000
JP   2000-305761   11/2000

* cited by examiner

*Primary Examiner* — Nitin Patel
*Assistant Examiner* — Zahid Choudhury
(74) *Attorney, Agent, or Firm* — Blakely, Sokoloff, Taylor & Zafman LLP

(57) ABSTRACT

According to one embodiment, if start-up of an application is abnormal after starting up the application, the information processing apparatus reports the fact to the basic input/output system (BIOS), and the BIOS locks a system.

12 Claims, 3 Drawing Sheets

_(54)_ INFORMATION PROCESSING APPARATUS AND START-UP CONTROL METHOD

CROSS-REFERENCE TO RELATED APPLICATIONS

This application is based upon and claims the benefit of priority from Japanese Patent Application No. 2007-142203, filed May 29, 2007, the entire contents of which are incorporated herein by reference.

BACKGROUND

1. Field

One embodiment of the present invention relates to an information processing apparatus, such as a personal computer. And more specifically, the invention relates to an information processing apparatus configured to report that a module has started up normally to a system and a start-up control method for use in the apparatus.

2. Description of the Related Art

In general, a personal computer shifts control to an operating system on a hard disk drive (HDD), which is a boot medium, after starting up a basic input/output system (BIOS) of an operating system. A technique which starts up an application on the operating system, after this shift, is disclosed (refer to Jpn. Pat. Appln. KOKAI. Publication No. 2000-306761).

However, the technique given above produces the problem such that the BIOS, which is a system, may not grasp whether or not the application on the operating system has started up normally.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes start-up unit: when the basic program is started, control is shifted from the basic program to the boot medium, the start-up unit configured to start up a module stored in the boot medium; a transmission unit configured to transmit a start-up completion signal to the basic program from the module which has been started up by the start-up unit; and a reception unit configured to receives the start-up completion signal which has been transmitted from the transmission unit by the basic program, and if the start-up completion signal which has been received by the reception unit is abnormal, a system of the information processing apparatus is locked.

Hereinafter, the embodiments of the invention will be described with reference to the drawings.

Firstly, a configuration of an information processing apparatus regarding an embodiment of the invention will be described by referring to FIGS. 1 and 2. The information processing apparatus is actualized, for example, as a notebook-type personal computer 10.

Figure 1:
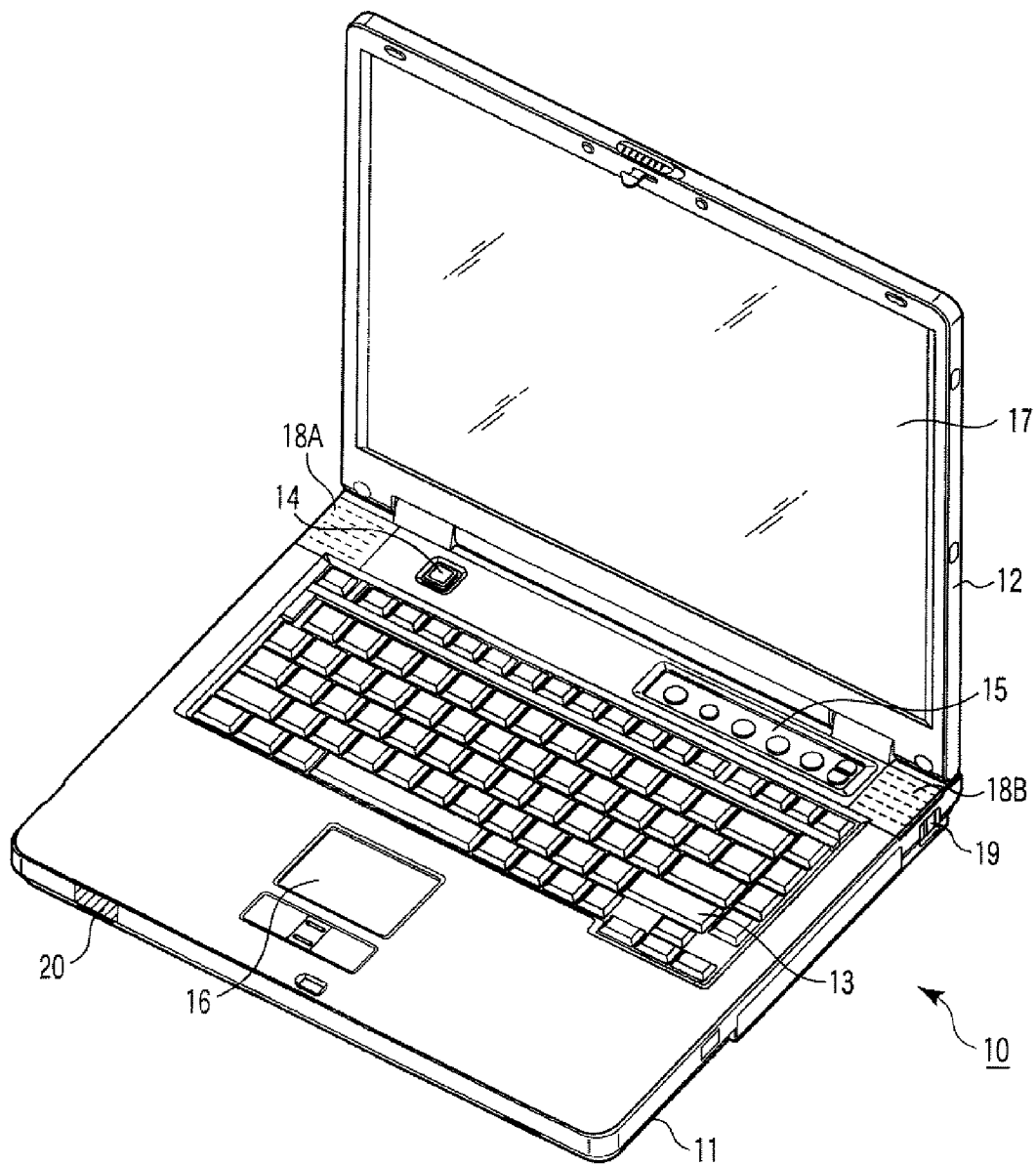
FIG. 1 is a perspective view depicting an exemplary example of a system configuration of a computer regarding an embodiment of the invention.
Figure 2:
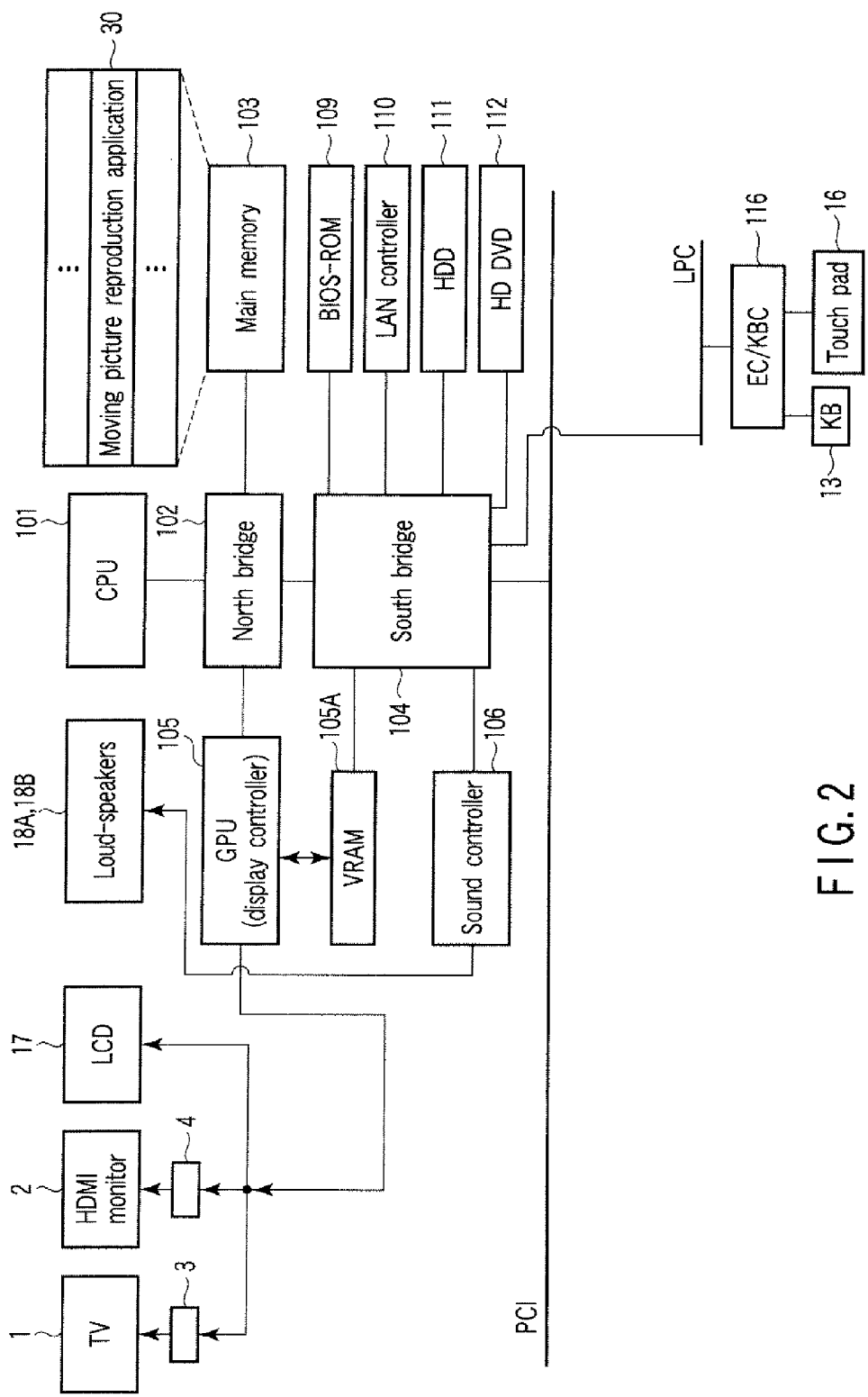
FIG. 2 is a block diagram depicting an exemplary functional configuration of the computer regarding the embodiment of the invention.

FIG. 1 shows a perspective view depicting a state in which a display unit of the notebook-type personal computer 10 is opened. The computer 10 is composed of a computer main unit 11 and a display unit 12. The display unit 12 has a display device consisting of a thin film transistor liquid crystal display (TFT-LCD) 17 built-in, and the display screen of the TFT-LCD 17 is positioned almost at the chanter of the display unit 12.

The display unit 12 is attached to the computer main unit 11 so as to freely rotate between an open position and the closed position. The computer main unit 11 has a thin-box-type housing, and a keyboard (KB) 13, a power button 14 for setting power on/power off the computer 10, an input operation panel 15, a touch pad 16, loud-speakers 18A, 18B, and an infra-red ray reception unit 20, etc., arranged on the upper surface of the main unit 11.

The input operation panel 15 is an input device which inputs an event corresponding to the depressed button on the panel 15, and includes a plurality of buttons for starting up a plurality of functions.

The system configuration of the computer 10 will be described by referring to FIG. 2.

The computer 10 includes a CPU 111, a north bridge 112, a main memory 113, a south bridge 115, a graphics controller 114, a BIOS-ROM 109, a network controller 117, a HDD 116, an embedded controller/keyboard controller IC (EC/KBC) 119, and a power source circuit 120.

The CPU 111 is a processor for controlling an operation of the computer 10, and executes an operating system and a various applications which are loaded on the main memory 113 from the HDD 116. The CPU 111 also executes the BIOS stored in the BIOS-ROM 109. The BIOS is a program for controlling hardware.

The north bridge 112 is a bridge device to connect between a local bus of the CPU 111 and the south bridge 115. The north bridge 112 also has a memory controller to control access of the built-in main memory 113. The north bridge 112 also has a function to execute communication with the graphic controller 114 via a serial bus in conformity with PCI EXPRESS standards.

The graphics controller 114 is a display controller which controls the LCD 17 to be used as a display monitor of the computer 10. The display signal to be generated from the graphics controller 114 is transmitted to the LCD 17.

The south bridge 115 controls each device on a low pin count (LPC) bus and each device on a peripheral component interconnect (PCI) bus. The south bridge 115 has an integrated drive electronics (IDE) controller to control the built-in HDD 116.

The IC (EC/KBC) 119 is a one-chip microcomputer with an embedded controller for power management and a keyboard controller for controlling the KB 13 and the touch pad 16 are integrated therein. The IC (EC/KBC) 119 has a function of performing power-on/power-off of the computer 10 in response to the operation of the power button 14 by a user.

Figure 3:
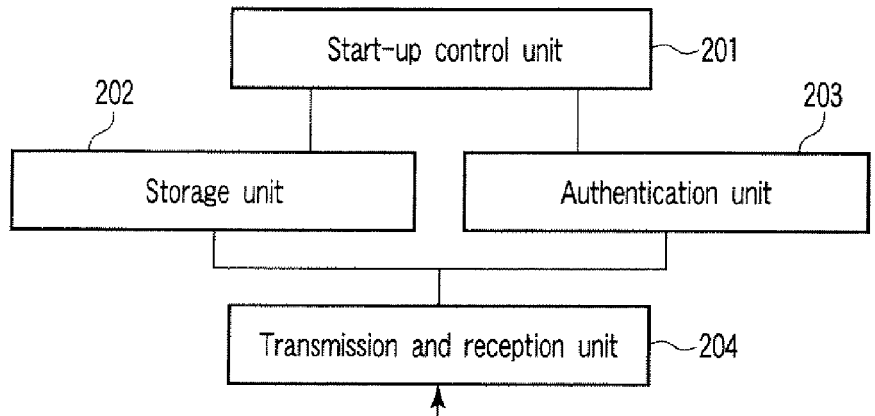
FIG. 3 is a block diagram depicting an exemplary functional configuration of the computer regarding the embodiment of the invention.

FIG. 3 shows the block diagram depicting the functional configuration regarding the embodiment of the information processing apparatus of the invention.

The function regarding the embodiment of the invention includes a start-up control unit 201, a storage unit 202, an authentication unit 203, and a transmission and reception unit 204. The start-up control unit 201 is the BIOS-ROM 109 and controls the whole of the system. The storage unit 202 is a flash memory for storing authentication information (password information etc.), and for storing waiting time information of a start-up completion signal (hereinafter referred to as a work confirmation call) and the storage unit 202 may also store the information and the signal (call) in the BIOS-ROM 109. The authentication unit 203 is the BIOS-ROM 109 and authenticates the application. The transmission and reception unit 204 transmits and receives the work confirmation call and authentication information of applications between the BIOS/ROM 109 and the application (module).

Figure 4:
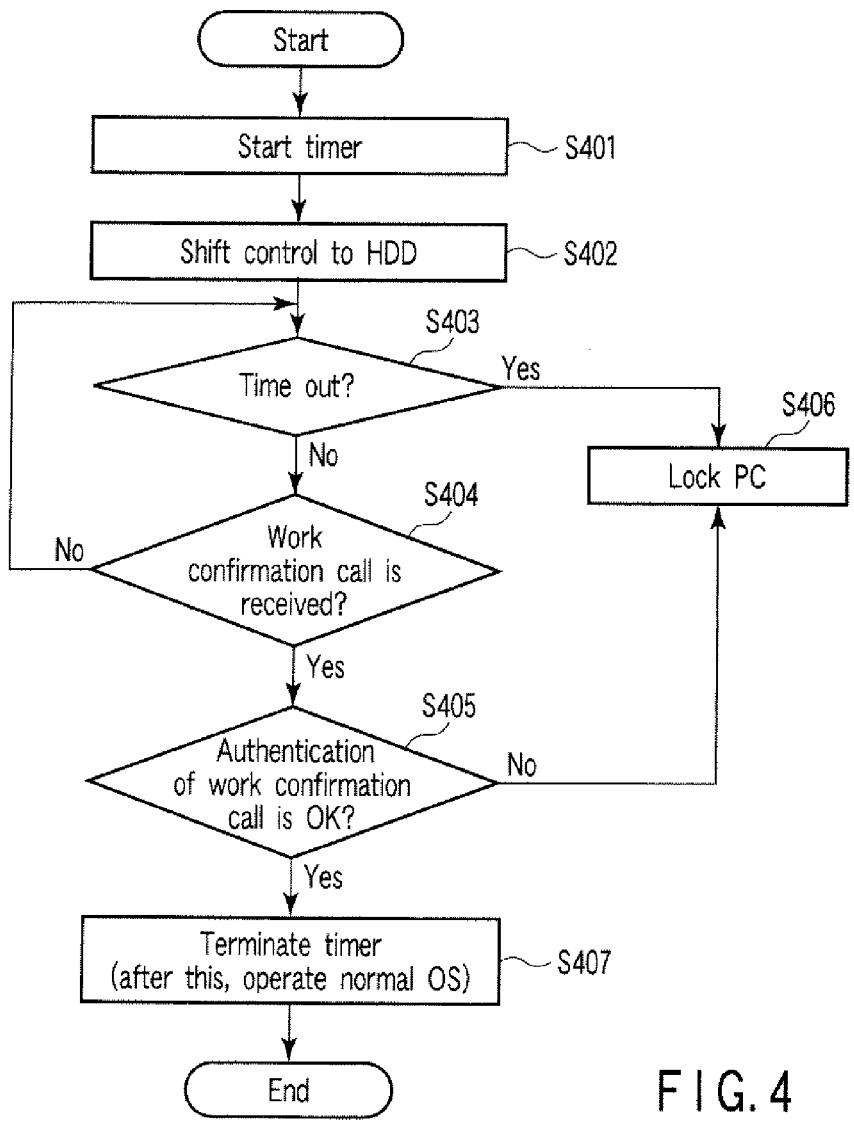
FIG. 4 is a flowchart for explaining an exemplary start up control method regarding the embodiment of the invention.

A start-up control method, with which the information processing apparatus regarding the embodiment of the invention is applied, will be described with reference to the flowchart of FIG. 4.

The BIOS-ROM (referred to as BIOS) 109 calls out waiting time information of the work confirmation call from the application (module) from the storage unit 202 and starts a timer in accordance with the waiting time information of the work confirmation call (Block S401). The operating system, on the HDD 111 that is a boot disk, is started up. The BIOS 109 shifts the control to the operating system on the HDD 111 (Block S402). The BIOS 109 starts, for example, an antivirus application (module) on the operation system. The BIOS 109 starts the process of waiting for the work confirmation call (start-up completion signal). If the timer that has started in Block S401 times out (YES in Block S403), the BIOS 109 locks a PC (system) (block S406).

Conversely, if the timer that has started in Block S401 does not time out (NO in Block S403), and if the information processing apparatus has received the start-up completion signal (work confirmation call) indicating the normal start-up from an antivirus application (YES in Block S404), the authentication unit 203 of the BIOS 109 reads password information, which has been shared in advance between the application and the BIOS, from the storage unit 202 and transmits the password information as a parameter to the antivirus application. The BIOS 109 determines whether or not the password information attached to the received work confirmation call and authenticates the password information (block S405). If the authentication unit 203 of the BIOS 109 determines that the password information attached to the received work confirmation call received is correct (OK in authentication) (YES in Step 405), the BIOS 109 terminates the timer of the waiting process for the work confirmation call (Block S407). The BIOS 109 replies the authentication result to the antivirus application to end the processing (after this, normal operations of the operating system are performed). When receiving a response signal of the work confirmation call, the antivirus application ends the transmission processing of the work confirmation call. The antivirus application continues the monitoring of viruses in a state in which the antivirus application has been started on the operating system.

The case of lock of the PC (system) represents the case such as a shut-down state, a pausing state and a standby state of the system. Further, the security-related use by the user may be restricted by performing processing capable of being performed without having to borrow strength of the application on the operating system, for example, by sounding an alarm, making it impossible for a specific device to be used.

While the aforementioned embodiment has described, for example, the antivirus application as the application (module) by way of example, various applications may be adapted for the information processing apparatus and the invention is not limited to the antivirus application as the application (module). Further, while the embodiment given above has described the HDD 111 as the boot disk by way of example, the invention is not limited to the HDD 111, and a flash memory or an optical disk, etc., can be used.

According to the invention, if the application has not started up normally, on the BIOS side may restrict the use of the system. That is, the BIOS may confirm whether the function required is in operation even after shifting the control to the boot medium such as a HDD. Therefore, BIOS processing may be changed by the operation of various applications on the boot medium. In other words, when the application etc., having a security function is not operated, the security of the information processing apparatus may be enhanced by forcibly locking or shutting down the device.

A modified example of the aforementioned embodiments will be described.

Although the embodiments given above have started the timer in accordance with the waiting time information of the start-up completion signal (work confirmation call) and started the waiting process for the work confirmation call, the invention need not start the waiting process and need not also make the timer time out. In this case, until the work confirmation call from the application is received and until authentication is performed normally, there is a possibility that the BIOS 109 will lock the system. Thus, the information processing apparatus achieves higher security than that of the embodiments given above.

A further modified example will be described. While the foregoing modified example has transmitted the password from the BIOS 109 in authenticating the foregoing work confirmation call to the antivirus application, the invention may use various authentication unit, such as a challenge response system or one time password without transmitting the password as it is. For example, in the case of use of the challenge response system, the BIOS 109 transmits random number information to the antivirus application. The antivirus application transmits both the received random number information and the pre-shared password information to the BIOS 109. The BIOS 109 may authenticate the work confirmation call by using both the received random number information and the pre-shared password information. Therefore, the security is further improved in comparison with the aforementioned embodiments.

It is our intention that the invention be not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the elements, for example, may be omitted from the whole of the constituent elements shown in the embodiments mentioned above. Further, the constituent elements over different embodiments may be appropriately combined.

The present invention has been achieved in consideration of the aforementioned circumstances; an object of the invention is to provide an information processing apparatus and a start-up control method configured to restrict the use of the system on the BIOS side if the application has not started normally.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus including a memory including information that, when executed, performs an operation within the information processing apparatus, comprising:
 a start-up module stored in the memory and configured to shift control to an operating system on a boot medium from a basic input/output system (BIOS) in order to start up an application on the boot medium, after the BIOS is started up; and
 a reception module stored in the memory and configured to cause the BIOS to perform a process of waiting for reception of a start-up completion signal from the application, the application being configured to transmit the start-up completion signal to the BIOS after the application is started up,
 wherein the BIOS is configured to lock the information processing apparatus if the start-up completion signal is not received until a predetermined time period elapses.

2. The apparatus according to claim 1, wherein the start-up completion signal is a signal which indicates that the application has been started up normally.

3. The apparatus according to claim 1, wherein the application is configured to encrypt and transmit the start-up completion signal.

4. The apparatus according to claim 1, wherein the BIOS is configured to authenticate the start-up completion signal.

5. A start-up control method which controls an information processing apparatus, comprising:
 shifting control to an operating system on a boot medium to start up an application on the boot medium when a basic input/output system (BIOS) has been started up;
 causing the BIOS to start a process of waiting for reception of a start-up completion signal from the application, the application being configured to transmit the start-up completion signal to the BIOS after the application is started up; and
 causing the BIOS to lock the information processing apparatus if the start-up completion signal is not received until a predetermined time period elapses.

6. The method according to claim 5, wherein the start-up completion signal is a signal indicating that the application has been started up normally.

7. The method according to claim 5, wherein the application is configured to encrypts the start-up completion signal and transmits the encrypted signal to the BIOS.

8. The method according to claim 5, wherein the BIOS is configured to authenticates the start-up completion signal.

9. A method comprising:
 starting of a basic input/output system (BIOS) within an information processing apparatus;
 shifting control to an operating system on a boot medium from the BIOS in order to commence start-up of an application on the boot medium by a processor within the information processing apparatus;
 awaiting reception a start-up completion signal from the application by the BIOS, the application being configured to transmit the start-up completion signal to the BIOS after start-up of the application; and
 locking the information processing apparatus by the BIOS if the start-up completion signal is not received within a predetermined time period after shifting control to the operating system.

10. The method according to claim 9, wherein the start-up completion signal is a signal which indicates that the application has been started up normally.

11. The method according to claim 9, wherein the application is configured to encrypt and transmit the start-up completion signal.

12. The method according to claim 9, wherein the BIOS is configured to authenticate the start-up completion signal.

* * * * *